United States Patent
Devins et al.

(10) Patent No.: US 6,868,545 B1
(45) Date of Patent: Mar. 15, 2005

(54) METHOD FOR RE-USING SYSTEM-ON-CHIP VERIFICATION SOFTWARE IN AN OPERATING SYSTEM

(75) Inventors: Robert J. Devins, Essex Junction, VT (US); Paul G. Ferro, South Burlington, VT (US); Robert D. Herzl, South Burlington, VT (US); Kenneth A. Mahler, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/495,236

(22) Filed: Jan. 31, 2000

(51) Int. Cl.[7] .................................................. G06F 3/00
(52) U.S. Cl. .................... 719/327; 719/321; 714/734; 714/741; 714/742
(58) Field of Search ...................... 709/321; 719/327, 719/321

(56) References Cited

U.S. PATENT DOCUMENTS

| | | | |
|---|---|---|---|
| 5,600,579 A | * 2/1997 | Steinmetz, Jr. | 703/13 |
| 5,832,515 A | * 11/1998 | Ledain et al. | 707/202 |
| 5,838,948 A | 11/1998 | Bunza | 395/500 |
| 5,867,710 A | * 2/1999 | Dorris et al. | 717/124 |
| 5,923,876 A | * 7/1999 | Teague | 709/321 |
| 6,041,363 A | * 3/2000 | Schaffer | 709/321 |
| 6,085,156 A | * 7/2000 | Rust et al. | 702/91 |
| 6,253,255 B1 | * 6/2001 | Hyder et al. | 709/321 |

* cited by examiner

Primary Examiner—Thomas Lee
Assistant Examiner—Phuong N. Hoang
(74) Attorney, Agent, or Firm—Connolly Bove Lodge & Hutz LLP; Larry J. Hume

(57) ABSTRACT

The time, effort and expense required to develop verification software for testing and de-bugging system-on-chip (SOC) designs represents a considerable investment. According to the method of the present invention, a portion of such verification software may be re-used in an operating system (OS) (i.e., a system used for, e.g., general business, technical or scientific applications as opposed to software testing) to capitalize on the investment.

The verification software includes low-level device drivers (LLDDs) which were coded for and paired with specific device designs ("cores") throughout the verification process, and were consequently also verified (i.e., de-bugged) in the process. Thus, the low-level device drivers represent reliable software with detailed knowledge of the corresponding devices.

By developing a thin middle-level device driver layer of software to interface between a particular OS and the lower-level device drivers, the LLDDs can be re-used in an OS that uses devices that the LLDDs were designed for. This frees SOC customers from having to develop low-level software and instead allows them to concentrate on developing their particular applications, or "value-added" software.

24 Claims, 7 Drawing Sheets

METHOD FOR RE-USING SYSTEM-ON-CHIP VERIFICATION SOFTWARE IN AN OPERATING SYSTEM

CROSS REFERENCE TO RELATED APPLICATIONS

This application is related by common inventorship and subject matter to co-pending applications titled "Method of Controlling External Models in System-On-Chip Verification" (Ser. No. 09/494,230), "Simulator-Independent System-On-Chip Verification Methodology" (Ser. No. 09/494,565), "Method of Developing Re-Usable Software for Efficient Verification of System-On-Chip Integrated Circuit Designs" (Ser. No. 09/494,907), "Method for Efficient Verification of System-On-Chip Integrated Circuit Designs Including an Embedded Processor" (Ser. No. 09/494,564), and "Processor-Independent System-On-Chip Verification for Embedded Processor Systems" (Ser. No. 09/494,386). The listed applications are assigned to International Business Machines Corporation, and the contents of each are incorporated herein by reference.

BACKGROUND OF THE INVENTION

The present invention relates to device driver software used in computer operating systems. More particularly, the invention relates to a method for re-using device drivers, which were initially developed for verification of specific device designs in a development phase of the designs, as device drivers in an operating system which uses physical implementations of the devices.

The complexity and sophistication of present-day integrated circuit (IC) chips have advanced significantly over those of early chip designs. Where formerly a chip might embody relatively simple electronic logic blocks effected by interconnections between logic gates, currently chips can include combinations of complex, modularized IC designs often called "cores" which together constitute an entire "system-on-a-chip", or SOC.

In general, IC chip development includes a design phase and a verification phase for determining whether a design works as expected. The verification phase has moved increasingly toward a software simulation approach to avoid the costs of first implementing designs in hardware to verify them.

Typically, in verifying a design, a simulator is used. Here, "simulator" refers to specialized software whose functions include accepting software written in a hardware description language (HDL) such as Verilog or VHDL which models a circuit design (for example, a core as describe above), and using the model to simulate the response of the design to stimuli which are applied by a test case to determine whether the design functions as expected. The results are observed and used to de-bug the design In order to achieve acceptably bug-free designs, verification software must be developed for applying a number of test cases sufficient to fully exercise the design in simulation. In the case of SOC designs, the functioning of both the individual cores as they are developed, and of the cores interconnected as a system must be verified. Moreover, a complete SOC design usually includes an embedded processor core; simulation which includes a processor core tends to require an inordinate amount of time and computing resources, largely because the processor is usually the most complex piece of circuitry on the chip and interacts with many other cores.

It can be appreciated from the foregoing that verification of an SOC represents a substantial investment in time and money, due to the necessity of developing and executing software for performing the numerous test cases required to fully exercise the design. Accordingly, the ability to capitalize on this investment by re-using the verification software with general operating system software (i.e., operating system software used in, for example, general business, technical or scientific applications as opposed to simulation) would offer significant benefits. For example, typically SOC customers want to concentrate on their own "value-added" software, that is, software that they need to develop for their particular applications. Verification software that handled low-level, standard operating system functions such as device I/O, which was furthermore "tried-and-true" through the verification process, would provide customers with significantly software development burdens.

SUMMARY OF THE INVENTION

In the method according the present invention, a portion of software developed for verification of a system-on-chip design is re-used in an operating system (OS). The re-used software comprises low-level devices drivers (LLDDs) which were developed to verify specific cores, and paired with those specific cores throughout the verification process. The LLDDs are designed to provide an interface between higher-level software and core hardware.

A middle-level device driver (MDD) is developed to interface between a particular OS and an LLDD, to translate OS-specific function calls to system devices into a LLDD-specific form which is applied to the LLDD, which performs hardware-level operations on its corresponding core in response.

Because the LLDDs are fully verified by the verification process and designed to handle core-level detail, they provide reliable low-level software to SOC customers, allowing the customers to concentrate on developing their value-added software. Further, migration of LLDDs to different OSs is easily accomplished by re-coding only a thin MDD layer of software.

DETAILED DESCRIPTION OF THE INVENTION

Figure 1:
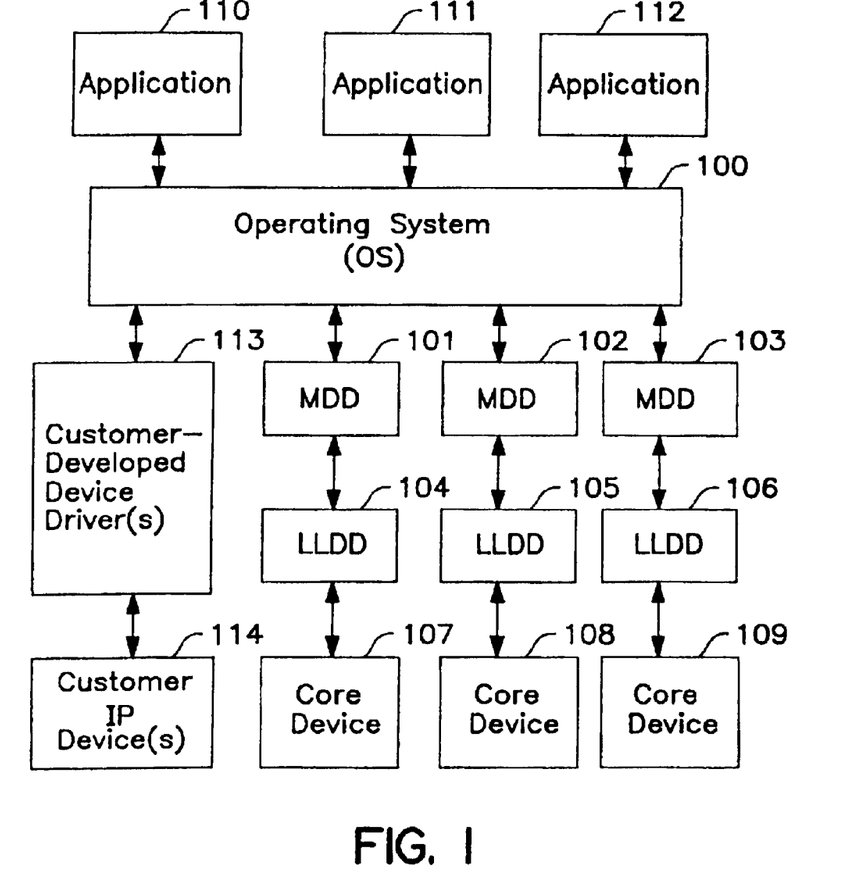
FIG. 1 is a functional block diagram illustrating relationships among software components for implementing the method of the present invention.

FIG. 1 illustrates a functional block diagram comprising software for implementing the method of the present invention. The operating system (OS) 100 represents any of a number of commercially available operating systems such as VxWorks ®, Wind River ® or Windows CE for use with embedded processor systems such as those using the PowerPC ® processor architecture.

As is well-understood in the computer/data processing field, an operating system such as the OS 100 typically supports application programs such as 110–112 by performing system management functions such as multi-tasking the applications, managing the sharing of internal memory among the applications, and handling I/O to and from attached hardware devices, represented by core devices, 107–109 on behalf of the applications.

As is further well-understood, an OS 100 typically interfaces with devices such as 107–109 using device drivers such as low-level device drivers (LLDDs) 104–106. Device drivers typically comprise software having a specialized structure for handling the hardware-level detail of driving operations by devices such as 107–109. Device drivers support an application program interface (API) to higher-level software such as the OS 100 so that the OS does not need to handle hardware-level detail In the method of the present invention, the LLDDs 104–106 are device drivers that were paired with core devices 107–109, respectively, during verification of the core designs by a process utilizing simulation. A method for developing LLDDs such as 104–106 which are re-usable in an OS 100 is described below.

The middle-level device drivers (MDDs) 101–103 interface between the OS 100 and the LLDDs 104–106, respectively. The MDDs represent a layer of software which is structured to handle requests or directives from a specific OS 100 to the devices 107–109 to perform some operation, by translating the system-specific directive into a driver-specific form which is usable by the LLDDs 104–106. The LLDDs then translate this driver-specific form into a hardware-level form which may be applied to an associated device 107–109. The LLDDs further handle hardware-level signals such as interrupts from the associated device and pass them to the MDDs, which translate the signal into a system-specific form which is understandable to the OS.

Customer-developed device driver(s) 113 and customer IP device(s) 114 represent driver(s) and device(s) developed independently of the verification process described above, and which would also typically be part of a customer system.

The LLDDs according to the method of the present invention, as noted above, would typically be developed as part of a verification process for a SOC design which included core devices 107–109. The term "core" as used herein refers to a module of logic representing a circuit design of any degree of complexity, which may be used as a component of a SOC. In its developmental stages, a core is typically embodied as a simulatable HDL program written at some level of abstraction, or in a mixture of abstraction levels, which can describe the function of the core prior to its actual physical implementation in silicon. Major levels of abstraction that are generally recognized include a behavioral level, a structural level, and a logic gate level. A core may be in the form of a netlist including behavioral, structural and logic gate elements. Ultimately, after verification, design logic represented by a core is physically implemented in hardware.

Figure 2:
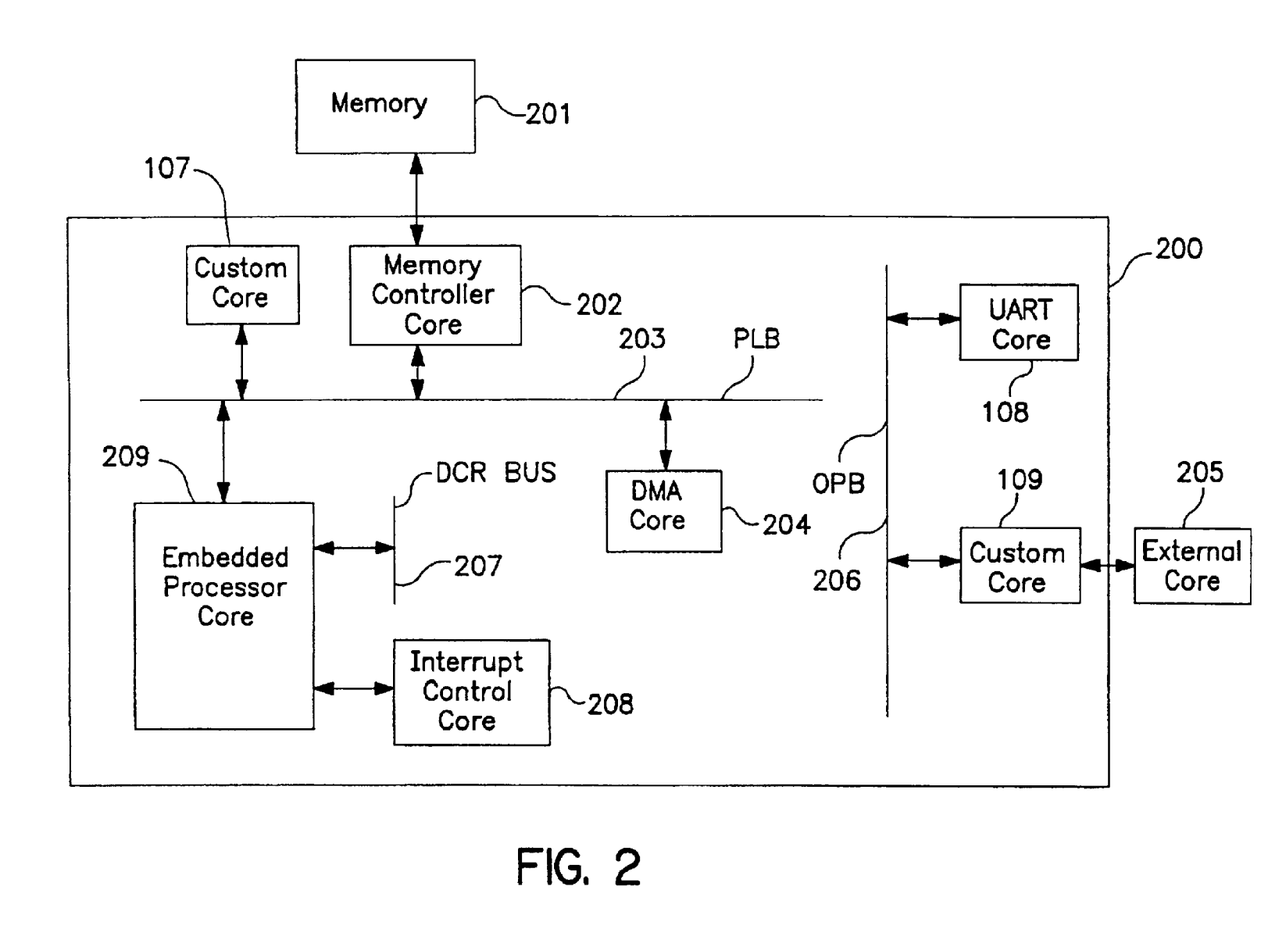
FIG. 2 illustrates an example of components of a system-on-chip (SOC) design.

FIG. 2 illustrates an example of components of a SOC design 200 including multiple cores; the representation is intended to include embodiments in any known form of logic design, including simulatable HDL modules and netlists, and physical implementations. The SOC 200 includes a custom core 107 coupled to a processor local bus (PLB) 203, a memory controller 202 coupled to a memory core 201 and to the PLB, a Direct Memory Access (DMA) core 204 coupled to the PLB, a Universal Asynchronous Receiver Transmitter (UART) core 108 coupled to an on-chip peripheral bus (OPB) 206, a second custom core 109 coupled to a core 205 which is external to the chip, an interrupt control core 208 coupled to an embedded processor core 209 and a device control register (DCR) bus 207 coupled to the embedded processor core. Memory core 201 is also external to the SOC 200. Cores 107, 108 and 109 correspond to the like-numbered elements shown in FIG. 1 being used by an OS 100.

Custom cores 107 and 109 represent design logic tailored to a particular application of the SOC. Other cores, such as the UART 108 and DMA 204 cores, may have well-standardized embodiments (sometimes called Application-Specific Integrated Circuits or ASICs) which are widely available from vendors. Typically, the design of a SOC comprises a combination of such custom cores and ASICs.

Figure 3A:
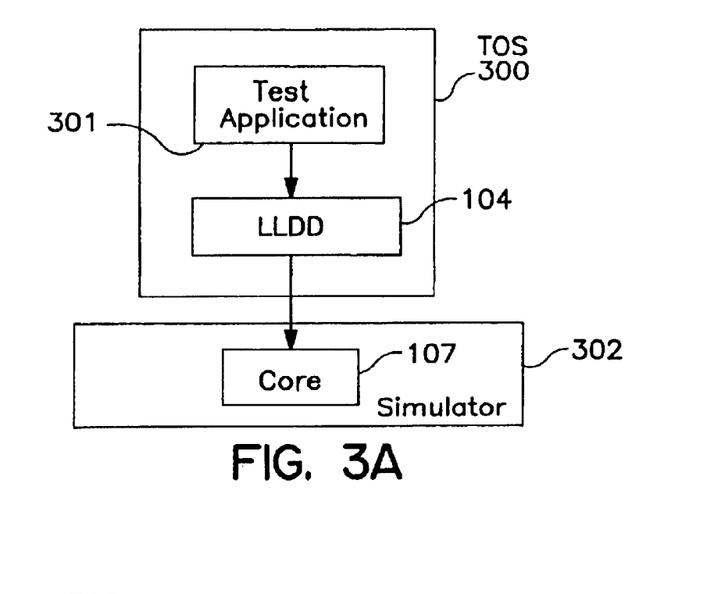
FIGS. 3A-C illustrate a methodology for performing verification of a SOC.

As shown in FIG. 3A, to enable verification of a component core of a SOC 200 design, a test operating system (TOS) 300 is provided. The TOS 300 comprises at least a test application 301 which generates a test case which is applied by a LLDD 104 to a core; for example, custom core 107 implemented as a HDL module. Simulator 302 interprets HDL descriptions in the core 107 to simulate the behavior of a hardware device corresponding to the core, in response to the test stimulus.

LLDD 104 in FIG. 3A is the same LLDD 104 as shown in FIG. 1, while core 107 corresponds with core device 107 of FIG. 1, core device 107 of FIG. 1 being a physical implementation of the design represented by core 107 of FIG. 3A.

The test case generated by the test application 301 typically comprises computer-executable instructions which generate stimuli to verify the design. The application of the test case typically produces, as output, results data representing the response of the simulated design which is compared to expected results, to determine whether the design functions as expected. The design may subsequently be revised to improve performance or de-bug errors.

Figure 3B:
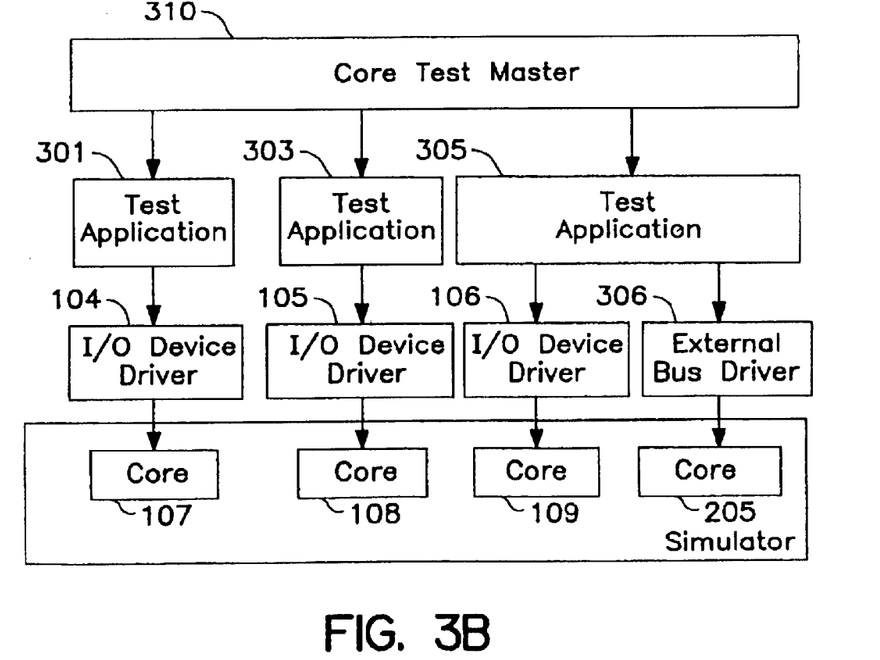
Figure 3C:
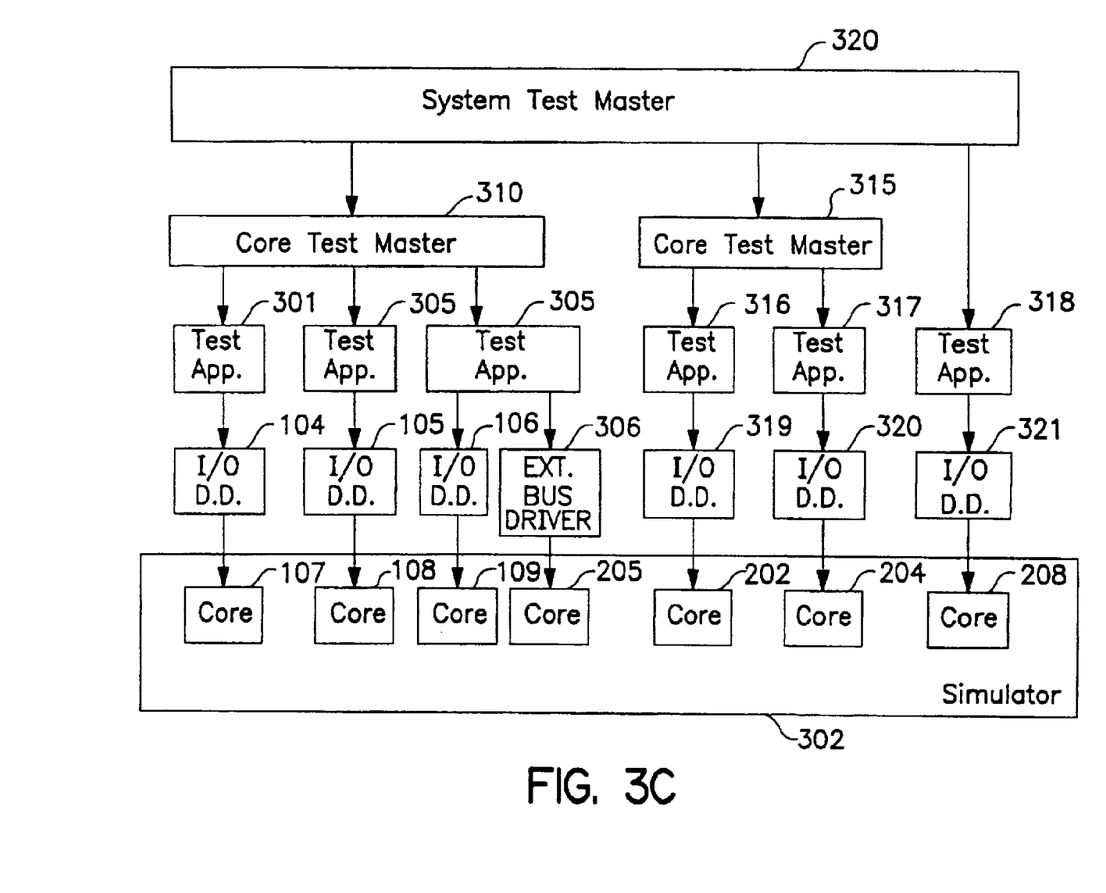

A more general depiction of the TOS 300 is shown in FIGS. 3B and 3C. The TOS 300 is hierarchically organized. An upper level of the TOS may comprise a core test master 310 and a plurality of test applications such as test applications 301, 303 and 305, or include a still higher level such as a system test master 320 as shown in FIG. 3C. The upper-level code performs such functions as decision-making, test initialization, test randomization, multi-tasking, and comparison of test results with expected results.

FIG. 3B represents test applications 301, 303 and 305 executing under the control of a core test master 310 in a multi-tasking environment. Each test application corresponds to a particular core 107, 108, 109 and 205 being tested. As shown, the LLDDs may be, more particularly, I/O device drivers such as 104, 105 and 106 which perform operations on cores internal to the SOC 200, and external bus drivers such as 306 which perform operations on cores external to the SOC.

FIG. 3C shows a system test master 320 controlling core test masters 310 and 315, which in turn control their respective test applications. The system test master also controls a test application 318 paired with a core 208 via a LLDD 321.

The LLDDs 104, 105, 106, 306, 319, 320 and 321 of FIGS. 3B and 3C represent a low level of the TOS 300. The LLDDs provide an interface between the higher-level software such as the system test masters, core test masters and the test applications, and the core being simulated. Because the cores being simulated correspond to target hardware (i.e., the physical elements which will ultimately implement the design logic), operations on the cores occur on a hardware level. These operations are performed by the LLDDs, and include register I/O and interrupt handling.

The hierarchical structure of the TOS as outlined above, and pairing of test applications with supporting LLDDs corresponding to specific cores, provides for the reusability of test cases developed for individual cores at succeeding stages of development of an SOC; i.e., from simulation to real hardware. Further, as described herein, the resulting LLDDs are re-usable in a OS. That is, as cores are developed, the TOS can be used to first test the cores on an individual basis, as shown in FIG. 3A, by developing a test application and LLDD pair specific to the core. Then, as shown in FIG. 3B, multiple cores can be tested in a chip-specific combination by developing a core test master to simulate interaction among components of the SOC, re-using the test application and LLDD pairs developed earlier. Ultimately, chip-specific core combinations can be tested by developing a system test master to control one or more core test masters and/or test applications, as shown in FIG. 3C, with the system test master generating randomized parameters to emulate the usage of the physical SOC in the field. FIG. 3C shows an example of a system-level exercise which re-uses core test master 310 and its associated test applications and LLDDs, and includes a second core test master 315 and a test application 318 paired with LLDD 321 and corresponding core 208. Core test master 315 controls test applications 316 and 317, paired with LLDDs 319 and 320 and corresponding cores 202 and 204.

LLDDs 104, 105 and 106 in FIG. 3C are the same LLDDs 104, 105 and 106 as shown in FIG. 1, while cores 107, 108 and 109 correspond with core devices 107, 108 and 109 of FIG. 1, the core devices of FIG. 1 being physical implementations of the designs represented by cores 107, 108 and 109 of FIG. 3C. It may be appreciated from the foregoing that the LLDDs 104, 105 and 106 are fully verified along with their corresponding cores by the application of increasingly complex test cases throughout the development of a SOC, as described above. Consequently, the LLDDs offer a high degree of reliability when used in an OS according to the present invention.

To support reusability of LLDDs as described above, the TOS imposes uniform coding rules for LLDDs. In general, the elements of the TOS are coded in a high-level programming language, such as "C", to provide for portability across hardware platforms during verification and from simulation to a hardware implementation of a SOC design.

The LLDDs are systematically coded in terms of core function to support their general applicability and re-usability. To this end, the details of the I/O operations of the LLDDs are "abstracted" by coding the LLDDs in terms of high-level functions. "Abstraction" as used herein refers generally to detaching a higher level of software from the details of implementing some function, which are instead handled by a lower level of software in response to a general request or directive from the higher level to perform the function. Such abstraction enables the LLDDs to support an API comprising a group of function calls which may be easily used by higher-level software such as the MDDs 101–103 described above and shown in FIG. 1.

The foregoing may be illustrated by the following example. A UART, for instance, such as core 108, has the basic function of receiving and transmitting data, once configured. Thus, a functional model of a UART might consist simply of "Configure", "Receive" and "Transmit" functions. On an actual implementation level, however, a UART serializes data, typically by using a clock and a shift register, and serial-in and serial-out pins. For example, in a typical UART "Receive" operation, upon request from a higher level of software, bits of data representing a character are shifted into a receive buffer through the serial-in bit at a given baud rate, and the UART generates an interrupt to signal that the character has been received. In a typical "Transmit" operation, the UART shifts bits of character data out through a serial-out pin, and generates an interrupt to signal that the receive buffer is empty.

Thus, the "Configure", "Receive" and "Transmit" functions mentioned above represent an abstraction of a UART core, which may be presented by an LLDD as an API to a higher level of software such as an MDD. That is, to use the UART, the MDD would issue a one-time "Configure" function call to the LLDD, followed, typically, by a sequence of "Receive" and/or "Transmit" specifying the data to be received and/or transmitted. In response, the LLDD would handle the details of configuring the UART core to, for example, the appropriate baud clock rate, parity and character size, initiating a serial operation, determining the cause of an interrupt, and the like.

Figure 4:
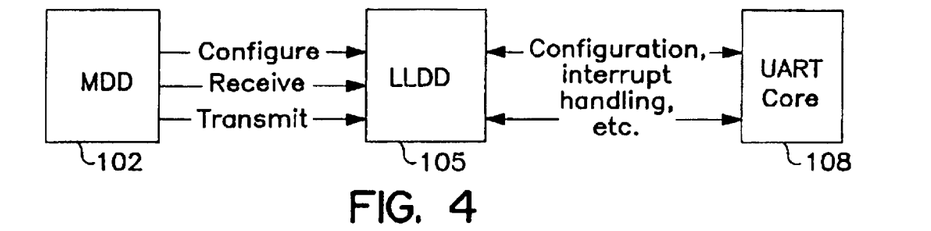
FIG. 4 illustrates a lower-level device driver (LLDD) according to the present invention, acting as an interface between a middle-level device driver (MDD) according to the present invention, and a Universal Asynchronous Receiver/Transmitter (UART) core.

The foregoing is illustrated conceptually in FIG. 4. MDD 102, LLDD 105 and UART core 108 correspond to the like-numbered elements of FIGS. 1-3C. LLDD 105 supports an API to higher-level software by correlating the high-level functions "Configure", "Receive" and "Transmit" with corresponding hardware-level operations such as configuration and interrupt handling on UART core 108. This enables the LLDD 105 to translate a function call from a higher level of software such as MDD 102 into the appropriate hardware-level operations.

The foregoing represents a simplified view of a UART, which would typically comprise more capabilities and functions. However, in general, the LLDDs for each core, whether a UART or some more complex core, are coded to provide an API which abstracts core hardware capabilities and protocols in terms of generalized function as described above. From a programming perspective, this would entail, for example, reviewing a technical specification of a core design to determine its capabilities and functions, defining an API in terms of those functions, and then coding a corresponding LLDD that included the necessary detail for handling the core's registers, programming bits, protocol, memory interface and the like to implement the API's functions.

The MDDs, as noted above, would be designed to interface between varying OSs and LLDDs. A particular OS would typically comprise system-specific requests or directives to its associated devices to perform some kind of work. The MDDs correlate system-specific directives with driver-specific functions (e.g., "Configure", "Receive" and "Transmit" as described above) to enable the translation of these system-specific directives into a driver-specific form which invokes a function in a LLDD's API, the LLDD then handles the corresponding detailed operations on the appropriate core device.

For example, a typical OS would have directives for performing serial I/O to a device such as a UART. Such directives might, for instance, be implemented as "Open"

and "Close" function calls for initiating file I/O, and "Read" and "Write" function calls. Thus, for example, a OS would issue an "Open" function call to initiate file I/O to the serial port of the UART, and then issue a "Write" function call to write a buffer of data to the serial port. The MDD would interpret the "Open" and "Write" directives and translate them into a driver-specific form. For example, the "Open" directive would be translated into "Configure" and "Write" would be translated into "Transmit", which could be applied to the LLDD corresponding to the UART. The LLDD would then perform the necessary UART configuration, interrupt handling and the like as described above to implement the writing of the buffer. When the writing of the buffer was complete, the UART would generate an interrupt, which would be passed by the LLDD to the MDD, which would translate the request into a system-specific form to communicate the completion to the "Write" operation to the OS.

Figure 5:
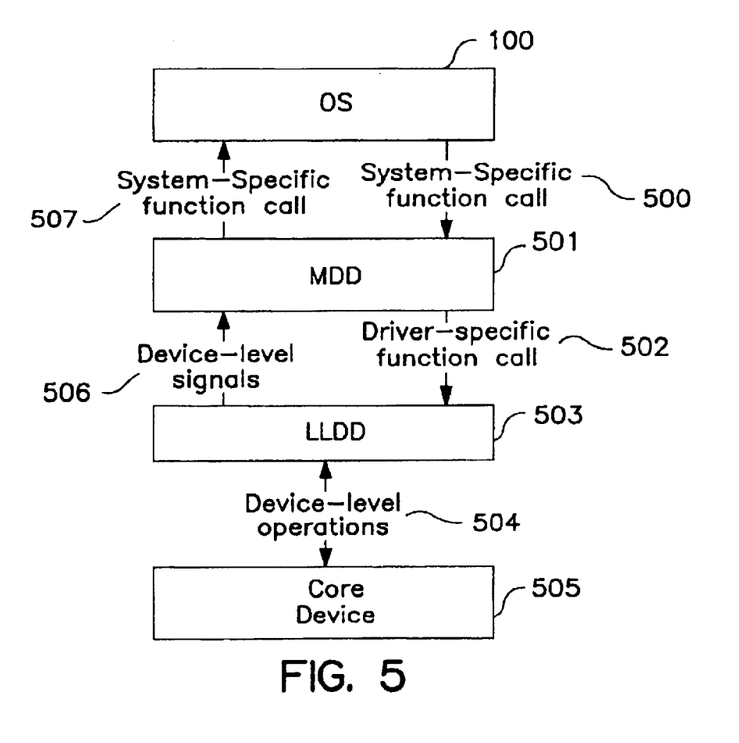
FIG. 5 illustrates communication by an operating system (OS) with a core device via a corresponding MDD and LLDD.

The foregoing is illustrated generally in FIG. 5. An OS 100 issues a system-specific (i.e., OS-specific) function call 500. A MDD 501 translates the system-specific function call into a driver-specific function call 502 which is applied to the appropriate LLDD 503. In response, LLDD performs device-level operations 504 on core device 505. The core device may generate a device-level signal 506 which is passed by the LLDD 503 to the MDD 501, which translates the device-level signal into a system-specific function call 507 for the OS 100, to inform it of the status of an operation by the core device 505 (e.g., read or write complete).

It may be appreciated from the above description that the present invention provides for significant benefits to SOC customers. The LLDDs provide fully-verified, reliable code for handling low-level operations, enabling customers to concentrate on developing their value-added software. Moreover, migration of LLDDs to different OSs entails simply re-writing a thin layer of MDD software, while the bulk of the code, the LLDDs, requires no changes.

Figure 6:
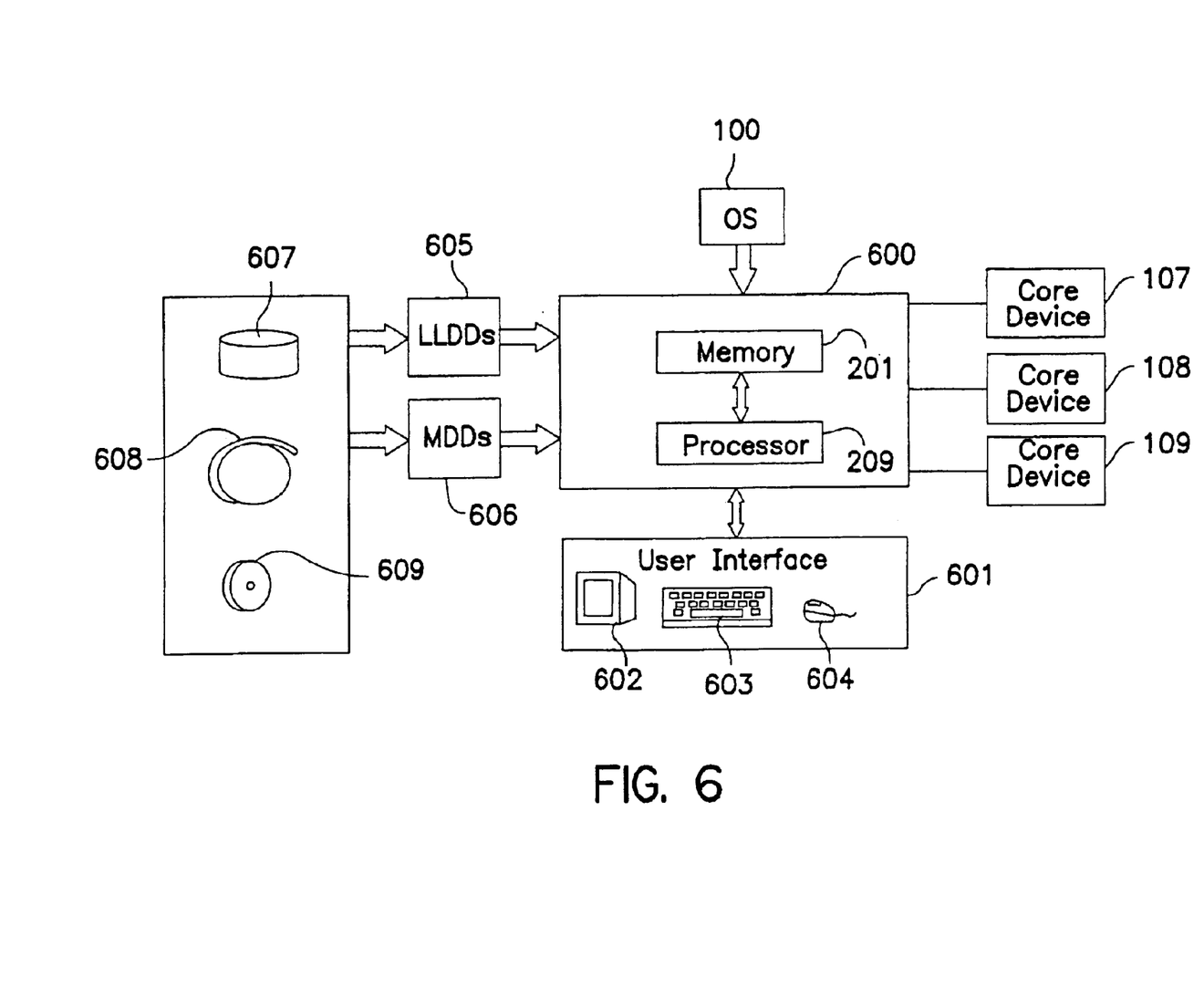
FIG. 6 illustrates a system for practicing the present invention.

FIG. 6 illustrates a system for practicing the invention. The computer 600 represents any of a number of suitable hardware platforms for executing the OS 100; for example, a PowerPC ® architected SOC including core devices 107, 108 and 109. The LLDDs 605 and MDDs 606 may be implemented in computer-executable instructions which may be stored on a computer-usable medium such as disk 607, tape 608 or CD-ROM 609. The instructions may be retrieved from the computer-usable medium, loaded into a memory 201 and executed by a processor 209 to effect the advantageous features of the invention. The system may include a user interface 601 comprising a display device 602 and user-input devices such as a keyboard 603 and mouse 604 to provide for user monitoring and control of the system.

Figure 7:
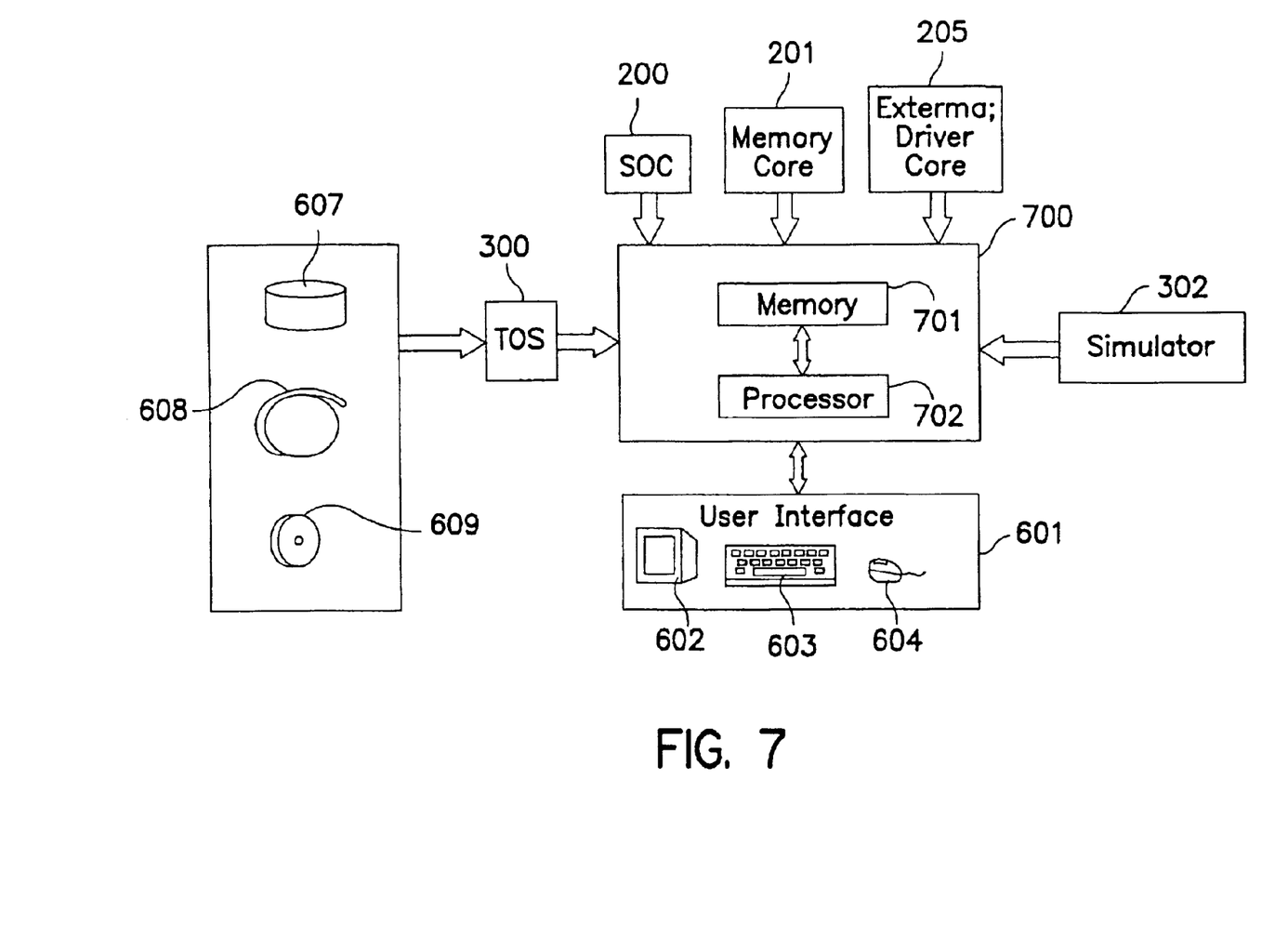
FIG. 7 illustrates a system for implementing a verification methodology described herein.

FIG. 7 illustrates a general purpose computer system for implementing a verification process as described above. The system includes a computer 700 comprising a memory 701 and a processor 702 which may be embodied, for example, in a workstation. The system further includes a user interface 601 comprising a display device 602 and user-input devices such as a keyboard 603 and mouse 604 for purposes of, for example, initiating and controlling a simulation session and observing simulation status and results.

The TOS 300, as noted above, may be implemented as computer-executable instructions which may be stored on a computer-usable medium such as disk 607, tape 608 or CD-ROM 609. The instructions may be read from a computer-usable medium as noted into the memory 701 and executed by the processor 702 to effect a verification test as described above.

The simulator 302 may be any of a variety of commercially-available simulators, including event simulators, cycle simulators and instruction set simulators. The simulator may run on the same workstation 700 as the TOS.

Typically, additional inputs to the computer 700 would include the SOC 200 being verified and external cores such as the memory core 201 and external driver core 205, embodied as simulatable HDL modules. The processor 702 would execute the simulator (simulation software) 302, which would use the input simulatable modules to simulate the behavior of corresponding hardware devices in response to instructions executed by the TOS 300.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

The invention claimed is:

1. A method for reusing system on chip (SOC) design verification software in an operating system, the method comprising:

providing a reusable low-level device driver which was initially paired with a simulated device representing a physical device during a verification phase of said SOC design;

providing a middle-level device driver for interfacing between said reusable low-level device driver and said operating system;

modifying said middle-level device driver to be compatible with the operating system; and using said middle-level device driver and said reusable low-level device driver to communicate between said operating system and said physical device, to perform operations by said physical device under the control of said operating system.

2. The method of claim 1, further comprising, during said verification phase of the SOC design:

applying a test case by said reusable low-level device driver to the simulated device to stimulate a design corresponding to said physical device; and verifying operation of said reusable low-level device driver concurrently with verification of said SOC design.

3. The method of claim 1, wherein said using said middle-level device driver and said reusable low-level device driver comprises:

using said middle-level device driver to translate a system-specific directive from said operating system to said physical device into a driver-specific directive; and using said reusable low-level device driver to apply said driver-specific directive to said physical device.

4. The method of claim 1, wherein said using said middle-level device driver and said reusable low-level device driver comprises:

using said low-level device driver to receive a device-level signal from said physical device and passing said device-level signal to said middle-level device driver;

using said middle-level device driver to translate said device-level signal into a system-specific form and passing said device-level signal to said operating system; and informing said operating system of a status of an operation performed by said physical device.

5. The method of claim 3, further comprising, at an interface with said middle-level device driver, correlating said system-specific directive with a function of said reusable low-level device driver.

6. The method of claim 3, further comprising, at an interface with said reusable low-level device driver, correlating a hardware-level operation performed by said physical device with a function of said reusable low-level device driver.

7. The method of claim 6, further comprising, by said driver specific directive, invoking said function to perform said hardware-level operation in response to said system-specific directive.

8. A computer-usable medium storing computer-executable instructions, said instructions, when executed, implementing a reusable low-level device driver and interfacing between a physical device and a higher level of software, said reusable low-level device driver having been paired with a simulated device representing said physical device during a verification phase of a system on chip (SOC) design verification, wherein the verification phase applying a test case by said reusable low-level device driver to the simulated device to stimulate a design corresponding to said physical device; and concurrently verifying said reusable low-level device driver and said SOC design.

9. The computer-usable medium of claim 8, wherein said interfacing between a physical device and the higher level of software comprises:

providing a middle-level device driver and an operating system, wherein said operating system uses said middle-level device driver and said reusable low-level device driver to communicate with said physical device and to perform operations by said physical device under the control of said operating system.

10. The computer-usable medium of claim 9, wherein:

said middle-level device driver translates a system-specific directive from said operating system to said physical device into a driver-specific directive; and said reusable low-level device driver applies said driver-specific directive to said physical device.

11. The computer-usable medium of claim 10, wherein said middle-level device driver comprises an interface which correlates said system-specific directive with a distinct function of said reusable low-level device driver.

12. The computer-usable medium of claim 10, wherein said reusable low-level device driver comprises an interface which correlates a hardware-level operation performed by said physical device with a function of said reusable low-level device driver.

13. The computer-usable medium of claim 12, wherein said driver-specific directive invokes said function to perform said hardware-level operation in response to said system-specific directive.

14. The computer-usable medium of claim 9, wherein:

said reusable low-level device driver receives a device-level signal from said physical device and passes said device-level signal to said middle-level device driver; and said middle-level device driver translates said device-level signal into a system-specific form and passes it to said operating system, said operating system informed of a status of an operation by said physical device.

15. A computer-usable medium storing computer-executable instructions, said instructions, when executed, implementing:

a middle-level device driver which provides an interface between an operating system and a reusable low-level device driver, said reusable low-level device driver interfacing between a physical device and a higher level of software, said reusable low-level device driver having been paired with a simulated device resenting said physical device during a verification phase system on chip (SOC) design.

16. The computer-usable medium of claim 15, wherein:

said middle-level device driver translates a system-specific directive from said operating system to said physical device into a driver-specific directive; and said reusable low-level device driver applies said driver-specific directive to said physical device.

17. The computer-usable medium of claim 16, wherein said middle-level device driver comprises an interface which correlates said system-specific directive with a distinct function of said reusable low-level device driver.

18. A data-processing system comprising:

an operating system;

a middle-level device driver;

a reusable low-level device driver; and a physical device;

wherein said reusable low-level device driver was paired with a simulated device representing said physical device during a system on chip (SOC) design verification phase;

said middle-level device driver interfacing between said reusable low-level device driver and said operating system; and said operating system using said middle-level device driver and said reusable low-level device driver to communicate with said physical device and to control operations of said physical device.

19. The data-processing system of claim 18, wherein said verification phase comprises applying a test case by said low-level device driver to the simulated device to stimulate an SOC design;

wherein said reusable low-level device driver is verified concurrently with said SOC design.

20. The data-processing system of claim 18, wherein:

said middle-level device driver translates a system-specific directive from said operating system to said physical device into a driver-specific directive; and said reusable low-level device driver applies said drive-specific directive to said physical device.

21. The data-processing system of claim 20, wherein said middle-level device driver comprises an interface which correlates said system-specific directive with a function of said reusable low-level device driver.

22. The data-processing system of claim 20, wherein said reusable low-level device driver comprises an interface which correlates a hardware-level operation performed by said physical device with a function of said reusable low-level device driver.

23. The data-processing system of claim 22, wherein said driver-specific directive invokes said function to perform said hardware-level operation in response to said system-specific directive.

24. The data-processing system of claim 18, wherein:
said low-level device driver receives a device-level signal from said physical device and passes said device-level signal to said middle-level device driver; and
said middle-level device driver translates said device-level signal into a system-specific form and passes it to said operating system, wherein said operating system is informed of a status and operation of said physical device.

* * * * *